United States Patent
Bird et al.

(10) Patent No.: US 8,959,075 B2
(45) Date of Patent: *Feb. 17, 2015

(54) SYSTEMS FOR STORING DATA STREAMS IN A DISTRIBUTED ENVIRONMENT

(71) Applicant: Red Lambda, Inc., Longwood, FL (US)

(72) Inventors: Robert Bird, Orlando, FL (US); Adam Leko, Madison, WI (US); Matthew Whitlock, Weare, NH (US)

(73) Assignee: Red Lambda, Inc., Longwood, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/194,945

(22) Filed: Mar. 3, 2014

(65) Prior Publication Data
US 2014/0207728 A1    Jul. 24, 2014

Related U.S. Application Data

(63) Continuation of application No. 13/479,772, filed on May 24, 2012, now Pat. No. 8,706,710.

(60) Provisional application No. 61/489,546, filed on May 24, 2011.

(51) Int. Cl.
*G06F 17/30* (2006.01)

(52) U.S. Cl.
CPC .... *G06F 17/30094* (2013.01); *G06F 17/30516* (2013.01); *G06F 17/30563* (2013.01)
USPC .......................................... 707/706; 707/711

(58) Field of Classification Search
CPC ............................................... G06F 17/30091
USPC ............................ 707/706, 707, 711; 726/2
See application file for complete search history.

(56) References Cited

U.S. PATENT DOCUMENTS

| | | | |
|---|---|---|---|
| 7,443,321 B1 | 10/2008 | Kaufman et al. | |
| 7,539,867 B2 * | 5/2009 | Bolosky et al. | 713/175 |
| 8,370,732 B2 | 2/2013 | Black et al. | |
| 8,473,778 B2 * | 6/2013 | Simitci et al. | 714/6.2 |
| 2003/0167380 A1 | 9/2003 | Green et al. | |
| 2004/0167906 A1 | 8/2004 | Smith et al. | |
| 2006/0206860 A1 | 9/2006 | Dardinski et al. | |
| 2007/0204128 A1 | 8/2007 | Lee et al. | |

(Continued)

OTHER PUBLICATIONS

Zhou, Wenchao et al., "Efficient Querying and Maintence of Network Provences at Internet Scale," Sigmody 1, Jun. 6-11, 2010, Indianoplis, IN Jun. 6, 2010.

(Continued)

*Primary Examiner* — Baoquoc N To
(74) *Attorney, Agent, or Firm* — Stephen J. Leahu; Carlton Fields Jordan Burt, PA

(57) ABSTRACT

Systems and methods for storing and retrieving data elements transmitted via data streams received from distributed devices connected via a network. The received data elements may be stored in block stores on the distributed devices. The stored data-elements may be allocated to data-blocks of a block-store that have assigned block-identifiers and further allocated to events of the data-blocks that have assigned token-names. Stream-schema of the received data-streams may comprise a list of token-names and an index-definition for each corresponding data-stream. Indices may be generated for the event-allocated data-elements. A query may be executed in order to retrieve data-elements of the received data-streams based on the indices.

39 Claims, 2 Drawing Sheets

(56) References Cited

U.S. PATENT DOCUMENTS

| | | |
|---|---|---|
| 2008/0095071 A1 | 4/2008 | Lu et al. |
| 2008/0098301 A1 | 4/2008 | Black et al. |
| 2008/0189429 A1 | 8/2008 | DaCosta |
| 2010/0106695 A1 | 4/2010 | Calder |
| 2012/0060072 A1* | 3/2012 | Simitci et al. .......... 714/756 |
| 2013/0124476 A1 | 5/2013 | Zhong et al. |

OTHER PUBLICATIONS

Manning, Christopher, Introduction to Information Retrieval, Jul. 2008, Cambridge University Press, New York Jul. 7, 2008.

"Apache Lucene Core", http://lucene.apache.org/core Dec. 31, 1900.

Jermaine, Chris, et al. "A Novel Index Supporting High Volume Data Warehouse Insertion", VLDB'99 Proceedings of the 25th International Conference on Very Large Data Bases, 1999, pp. 235-246, Morgan Kaufman Publishers Inc., San Francisco, CA Dec. 31, 1999.

Persin, Michael et al. "Filtered Document retrieval with fequency-sorted indexes", Journal of hte American Society for Information Science, Oct. 1996, pp. 749-764, vol. 47, Issue 10, John Wiley & Sons, New York. Oct. 31, 1996.

Davis, Mark. "Unicode Standard Annex #29", http://www.unicode.org/reports/tr29. Dec. 31, 1900.

* cited by examiner

SYSTEMS FOR STORING DATA STREAMS IN A DISTRIBUTED ENVIRONMENT

This application is a continuation application of U.S. patent application Ser. No. 13/479,772 filed on May 24, 2012, which is hereby incorporated by reference in its entirety. This application claims priority to, and incorporates herein by reference U.S. Provisional Patent Application No. 61/489,546 filed May 24, 2011.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The presently disclosed invention relate in general to the field of storing and retrieving data, and in particular to systems and methods for storing data streams in a distributed computing environment and for querying, retrieving, accessing, updating, and deleting stored data.

BACKGROUND OF THE INVENTION

Systems for storing and retrieving streams of data are known in the art. Such systems have been used for identifying intrusions in a network monitoring system. Such systems, however, do not scale well in distributed environments. The presently disclosed invention addresses that limitation by providing a block storage system and method that is both flexible and efficient, as well as being highly distributable.

SUMMARY OF THE INVENTION

The presently disclosed invention may be embodied in various forms, including a system, a method or computer readable medium for storing and retrieving data.

An embodiment of such a system may comprise, inter alia, distributed devices which may be adapted to communicate via a network. Data-streams may be received from the distributed devices, and each one of the data-streams may comprise data-elements. Block-stores may be stored on the distributed devices. These block-stores may store the data-elements of the received data-streams.

In such a system, the stored data-elements may be allocated to data-blocks of a block-store. Each one of the block-stores may comprise one or more data-blocks. Further, each data-block may comprise the stored data-elements of only one of the received data-streams. The data-blocks of a single data-stream may be logically grouped. In addition, each one of the data-blocks may be read and written as a single unit.

A block-identifier may be assigned to each one of the data-blocks. Such a block-identifier may be globally unique.

The system may comprise events of one or more data-blocks. The block-allocated data-elements may be further allocated to the events of the data-blocks. Each one of the data-blocks may comprise one or more events. Each one of the events may comprise the block-allocated data-elements of the corresponding data-block.

Token-names may be assigned to each one of the event-allocated data-elements. Each one of the event-allocated data-elements may have a token-name. The token-names may be human-readable names.

The system may include stream-schema of the received data-streams. Each one of the received data-streams may have a stream-schema. Further, each stream-schema may comprise a list of token-names for the event-allocated data-elements of the corresponding data-stream. The event-allocated data-elements of the corresponding data-stream may be capable of being identified based on the list of token-names. Each stream-schema may further comprise an index-definition for each corresponding data-stream.

Indices may be generated for the event-allocated data-elements based on the corresponding index-definition and the corresponding list of token-names. A query for the event-allocated data-elements may be executed in order to retrieve data-elements of the received data-streams. Such a query may be based on at least one of the indices.

Similarly, an embodiment of a method for the presently disclosed invention may include the step of receiving data-streams from distributed devices. The distributed devices may be connected via a network. Each one of the data-streams may comprise data-elements.

The method may include the step of storing the data-elements of the received data-streams. The stored data-elements may be stored in block-stores which may be stored on the distributed devices.

Further, the method may include the step of allocating the stored data-elements to data-blocks of the block-stores. Each one of the block-stores may comprise one or more data-blocks. Each data-block may comprise the stored data-elements of only one of the received data-streams. The data-blocks of a single data-stream may be logically grouped. Each one of the data-blocks may be read and written as a single unit.

The method may also include assigning a block-identifier to each one of the data-blocks. The block-identifier may be globally unique.

Further, the method may include allocating the block-allocated data-elements to events of the data-blocks. Each one of the data-blocks may comprise one or more events. Each one of the events may comprise the block-allocated data-elements of the corresponding data-block. In addition, the method may include the step of assigning a token-name to each one of the event-allocated data-elements. Each one of the event-allocated data-elements may have a token-name. The token-names may be human-readable names.

The method may also comprise reading stream-schema of the received data-streams. Each one of the received data-streams may have a stream-schema. Each stream-schema may further comprise a list of token-names for the event-allocated data-elements of the corresponding data-stream. The event-allocated data-elements of the corresponding data-stream may be capable of being identified based on the list of token-names.

In addition, the method may comprise generating indices for the event-allocated data-elements based on the corresponding index-definition and the corresponding list of token-names. The method may include the step of executing a query of the event-allocated data-elements based on an index and the step of retrieving the event-allocated data-elements based on results from the query.

In embodiments of the above-disclosed method and system, each of the block-stores may store the stored data-elements of two or more of the received data-streams.

In an embodiment, each stream-schema may further comprise an index-definition for each corresponding data-stream. Further, each index-definition may comprise an index-page 18 (not illustrated) and an index-set 19 (not illustrated) for each of the data-blocks of the corresponding data-stream. The stream-schema may further comprise block-size information for the data-blocks of the corresponding data-stream. The block-size information may provide a maximum block-size for data-blocks within the corresponding data-stream. In certain embodiments, each of the index-pages may further comprise a reference to a block-identifier for a corresponding data-block. In some embodiments, the index-page may further comprise page-data summarized-information of the data-blocks of the corresponding data-stream, and the index-set may further comprise root-data summarized-information of the index-pages of the corresponding index-definition.

In an embodiment, the data-elements may have a common structure. In certain embodiments, the common structure of the data-elements may be an unrestricted-structure. In some embodiments, the data-elements may have a common structure and each stream-schema may correspond to a common structure of each one of the events of the corresponding data-stream.

In other embodiments, the data-elements may have different structures. Each stream-schema may correspond to the varying structures of the events of the corresponding data-streams.

In an embodiment, the stored data-elements may comprise compound-data. The compound-data may be selected from a group consisting of lists and objects.

In an embodiment, the block-stores may support concurrent readers and writers. In an embodiment, the data-elements that are received from a distributed device may be stored in a targeted block-store only if the distributed device has write-access to a file-system utilized by the targeted block-store.

The method, in accordance with one embodiment, may further include the steps of receiving a request to write data of a data-stream from a distributed device, reading the stream-schema of the received data-stream, allocating local-memory to buffer each one of the events of the corresponding data-stream, and caching metadata of the stream-schema.

In an embodiment, the method may further comprise caching metadata of the stream-schema of the received data-streams. Each stream-schema may comprise metadata for the corresponding data-stream.

The method may further comprise filling a buffer until the buffer reaches a block-size provided by the block-size information for the data-blocks of the corresponding data-stream, and flushing the buffer into a file-system utilized by the targeted block-store. The buffer may be capable of being reused for the data-elements of the received data-streams.

In an embodiment, a method may further comprise allocating more than one buffer to a single data-stream, wherein concurrent-writers are utilized in the same distributed device.

A method may comprise the step of performing a transaction on the event-allocated data-elements. The transaction may be selected from the group consisting of querying, retrieving, accessing, updating, and deleting.

In some embodiments, a method may further comprise the step of accessing the index-set and the index-page for the data-blocks. Each index-definition may have a set of constraints that control which data-elements in a data-stream are returned. The method may include translating the constraints into a Boolean-expression. The Boolean-expression may be selected from a group consisting of a product-of-sums expression and a sum-of-products expression. Each Boolean-expression may be translated independently. The method may comprise analyzing the data-blocks with each Boolean-expression and determining a candidate set of data-blocks that contain matching-events for a Boolean-expression. In some embodiments, only if a Boolean-expression fails to determine a set of candidate data-blocks, then the method may comprise setting a candidate set of data-blocks to comprise all data-blocks in the corresponding data-stream. Further, the method may comprise retrieving the candidate set of data-blocks and evaluating the candidate set of data-blocks.

In certain embodiments of this method, the steps may further comprise updating at least one of the candidate set of data-blocks with updated data-blocks. At least one of the events may be removed in the updated data-blocks. Further, the method may include ignoring false-positives returned from a query of the updated data-blocks.

In an embodiment, the method may further comprise the step of using the results from the at least one query as input to a streaming-query. The streaming-query may provide join and windowing operations for data-elements of the received data-streams.

An embodiment may comprise the step of removing data-blocks based on a file-deletion operation and updated indices that reference that data block. The file-deletion operation may be a batched operation or a subsequent index-update operation.

In an embodiment, a block-store may require a file-system that supports concurrent updates to directory-structures. That block-store may require atomic writes to data-blocks. The data-blocks of the block-store may be consistent for each query performed after new data-blocks are written. A locking service may be utilized by the file-system.

In some embodiments, a method may comprise flushing pending data-blocks and corresponding index-pages and index-sets. In an embodiment, a block-store may have unconstrained concurrency. The unconstrained concurrency of the block-store may be limited by file-system capabilities.

In an embodiment, a method may further comprise the steps of: compressing the data-blocks, the index-pages, and the index-sets; flushing the compressed data-blocks, index-pages, and index-sets; and decompressing the flushed data-blocks, index-pages, and index-sets.

In accordance with certain embodiments, at least one of the distributed devices may be a distributed storage device, a sensor, or infrastructural equipment. Further, at least one of the indices may be a hash-index, a range-index, an interval-index, or a full-text index. At least one of the block-stores may store data based on an Abstract Syntax Notation One (ASN.1) encoding standard or a Distinguished Encoding Rules (DER) message-transfer syntax. The Distinguished Encoding Rules (DER) message-transfer syntax may be based on a X.690 International Telecommunication Union (ITU)-T recommendation.

BRIEF DESCRIPTION OF THE DRAWINGS

The foregoing and other objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention.

DETAILED DESCRIPTION OF THE EMBODIMENTS

Figure 1:
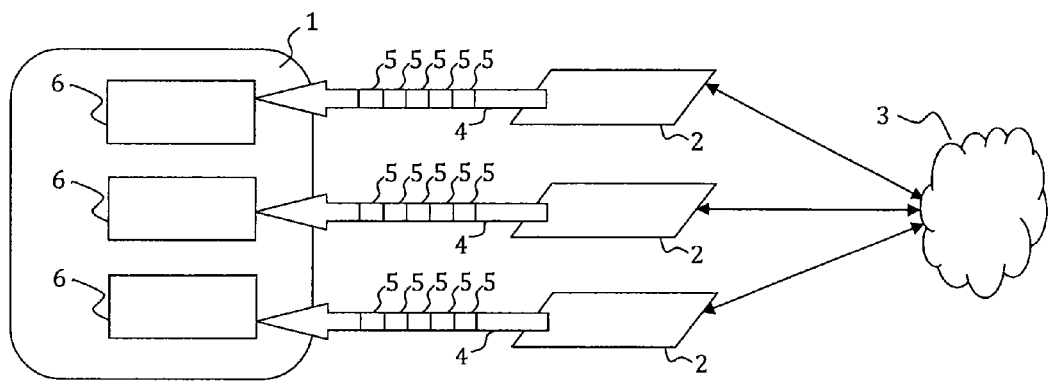
FIG. 1 is a block diagram illustrating components of an embodiment of a data storing system, in accordance with certain embodiments of the invention.

Reference will now be made in detail to the embodiments of the presently disclosed invention, examples of which are illustrated in the accompanying drawings.

The term "data element" shall mean a set of binary data containing a unit of information. Examples of data elements include, without limitation, a packet of data flowing across a network; a row returned from a database query; a line in a digital file such as a text file, document file, or log file; an email message; a message system message; a text message; a binary large object; a digitally stored file; an object capable of storage in an object-oriented database; and an image file, music file, or video file. Data elements often, but do not always, represent physical objects such as sections of a DNA molecule, a physical document, or any other binary representation of a real world object.

The term "instructions" shall mean a set of digital data containing steps to be performed by a computing device. Examples of "instructions" include, without limitation, a computer program, macro, or remote procedure call that is executed when an event occurs (such as detection of an input data element that has a high probability of falling within a particular category). For the purposes of this disclosure, "instructions" can include an indication that no operation is to take place, which can be useful when an event that is expected, and has a high likelihood of being harmless, has been detected, as it indicates that such event can be ignored. In certain preferred embodiments, "instructions" may implement state machines.

The term "machine readable storage" shall mean a medium containing random access or read-only memory that is adapted to be read from and/or written to by a computing device having a processor. Examples of machine readable storage shall include, without limitation, random access memory in a computer; random access memory or read only memory in a network device such as a router switch, gateway, network storage device, network security device, or other network device; a CD or DVD formatted to be readable by a hardware device; a thumb drive or memory card formatted to be readable by a hardware device; a computer hard drive; a tape adapted to be readable by a computer tape drive; or other media adapted to store data that can be read by a computer having appropriate hardware and software.

The term "network" or "computer network" shall mean an electronic communications network adapted to enable one or more computing devices to communicate by wired or wireless signals. Examples of networks include, but are not limited to, local area networks (LANs), wide area networks (WANs) such as the Internet, wired TCP and similar networks, wireless networks (including without limitation wireless networks conforming to IEEE 802.11 and the Bluetooth standards), and any other combination of hardware, software, and communications capabilities adapted to allow digital communication between computing devices.

The term "operably connected" shall mean connected either directly or indirectly by one or more cable, wired network, or wireless network connections in such a way that the operably connected components are able to communicate digital data from one to another.

The term "output" shall mean to render (or cause to be rendered) to a human-readable display such as a computer or handheld device screen, to write to (or cause to be written to) a digital file or database, to print (or cause to be printed), or to otherwise generate (or cause to be generated) a copy of information in a non-transient form. The term "output" shall include creation and storage of digital, visual and sound-based representations of information.

The term "server" shall mean a computing device adapted to be operably connected to a network such that it can receive and/or send data to other devices operably connected to the same network, or service requests from such devices. A server has at least one processor and at least one machine-readable storage media operably connected to that processor, such that the processor can read data from that machine-readable storage.

The term "system" shall mean a plurality of components adapted and arranged as indicated.

The meanings and definitions of other terms used herein shall be apparent to those of ordinary skill in the art based upon the following disclosure.

One of the objects of the present system and method may be an application in which streams of similar data values having a like internal structure are persisted for later retrieval, query and modification. The object for certain embodiments may concern the identification of intrusions in a network monitoring system. Embodiments may not be limited, however, to any one example application. Instead, the embodiments may be applicable in virtually any application in which a substantial stream of discrete units of input data having a common structure are persisted for later retrieval, updating, and deletion. The embodiments of the present system and method are well suited for implementation in a distributed environment in which streams of data are persisted across multiple data storage nodes connected in a network.

FIG. 1 is a block diagram illustrating components of an embodiment of a data storing system, in accordance with certain embodiments of the invention. As shown, such an embodiment may comprise block-stores 1 stored on distributed devices 2. The distributed devices 2 may be adapted to communicate via a network 3. Data-streams 4 may be received from the distributed devices 2. Each one of the data-streams 4 may comprise data-elements 5, which may be transmitted via the network 3. The block-stores 1 may store the data-elements 5 of the received data-streams 4. Such stored data-elements 5 may comprise digital copies of the transmitted data-elements 5.

The stored data-elements 5 may be allocated to data-blocks 6 of a block-store 1, as illustrated in FIG. 1. Such block-allocated data-elements 5 may be logically grouped. Each one of the block-stores 1 may comprise one or more data-blocks 6. Further, each data-block 6 may comprise the stored data-elements 5 of only one of the received data-streams 4. In addition, the data-blocks 6 of a single data-stream 4 may be logically grouped.

Figure 2:
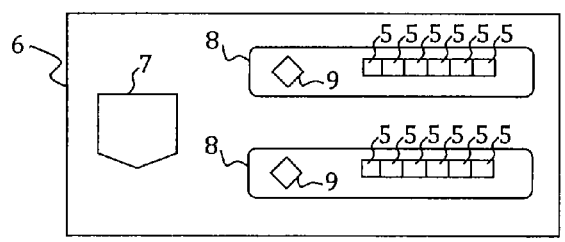
FIG. 2 is a block diagram illustrating a data-block, in accordance with certain embodiments of the invention.

As shown in FIG. 2, a block-identifier 7 may be assigned to each one of the data-blocks 6. Such a block-identifier 7 may be globally unique.

The data-blocks may comprise events 8. The block-allocated data-elements 5 may be further allocated to the events 8 of the data-blocks 6. Such event-allocated data-elements 5 may be logically grouped. Each one of the data-blocks 6 may comprise one or more events 8. Each one of the events 8 may comprise the block-allocated data-elements 5 of the corresponding data-block 6. These event-allocated data-elements 5 may comprise the stored data-elements 5 of only one of the received data-streams 4.

Token-names 9 may be assigned to each one of the event-allocated data-elements 5. Each one of the event-allocated data-elements 5 may have a token-name 9. The token-names 9 may be human-readable names.

Figure 3:
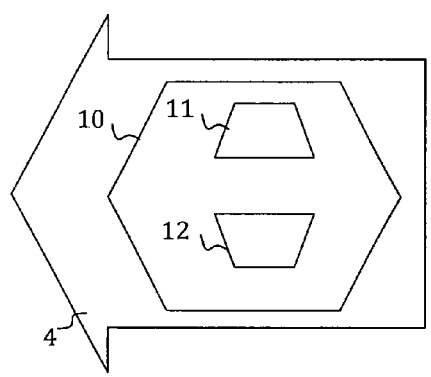
FIG. 3 is a block diagram illustrating a stream-schema, in accordance with certain embodiments of the invention.

Each one of the data-streams 4 may have a stream-schema 10, shown in FIG. 3. Further, each stream-schema 10 may comprise a list 11 of token-names 9 for the event-allocated data-elements 5 of the corresponding data-stream 4. The event-allocated data-elements 5 of the corresponding data-stream 4 may be capable of being identified based on the list 11 of token-names 9. Each stream-schema 10 may further comprise an index-definition 12 for each corresponding data-stream 4.

Figure 4:
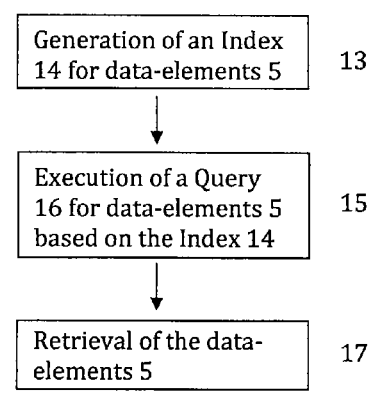
FIG. 4 is a flowchart illustrating index generation and query execution, in accordance with certain embodiments of the invention.

FIG. 4 depicts the generation 13 of indices 14 for the event-allocated data-elements 5 based on the corresponding index-definition 12 and the corresponding list 11 of token-names 9. Further, execution 15 of a query 16 for the event-allocated data-elements 5 may be executed in order to retrieve 17 data-elements 5 of the received data-streams 4. Such a query 16 may be based on at least one of the indices 14.

Figure 5:
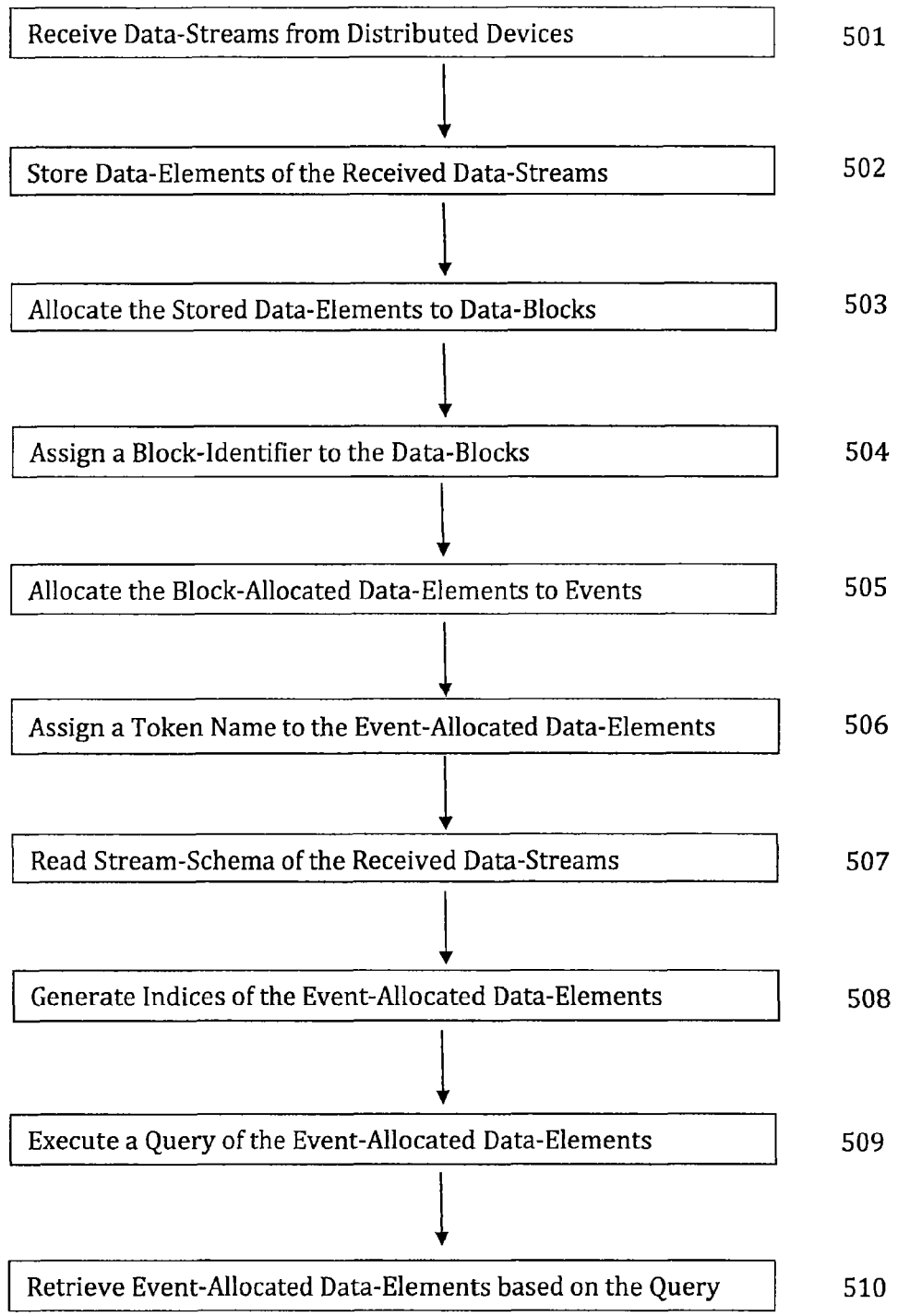
FIG. 5 is a flowchart illustrating steps of an embodiment of a data storing method, in accordance with certain embodiments of the invention.

FIG. 5 is a flowchart illustrating steps of an embodiment of a data storing method, in accordance with certain embodiments of the invention. As shown, such an embodiment may comprise the step of receiving 501 data-streams 4 from distributed devices 2. The distributed devices 2 may be connected via a network 3. Each one of the data-streams 4 may comprise data-elements 5.

The method may include the step of storing 502 the data-elements 5 of the received data-streams 4. The stored data-elements 5 may be stored in block-stores 1 which may be stored on the distributed devices 2.

Further, the method may include the step of allocating 503 the stored data-elements 5 to data-blocks 6 of the block-stores 1. Each one of the block-stores 1 may comprise one or more data-blocks 6. Each data-block 6 may comprise the stored data-elements 5 of only one of the received data-streams 4. The data-blocks 6 of a single data-stream 4 may be logically grouped together. Each one of the data-blocks 6 may be read and written as a single unit.

The method may also include assigning 504 a block-identifier 7 to each one of the data-blocks 6. The block-identifier 7 may be globally unique.

Further, the method may include allocating 505 the block-allocated data-elements 5 to events 8 of the data-blocks 6. Each one of the data-blocks 6 may comprise one or more events 8. Each one of the events 8 may comprise the block-allocated data-elements 5 of the corresponding data-block 6.

In addition, the method may include the step of assigning 506 a token-name 9 to each one of the event-allocated data-elements 5. Each one of the event-allocated data-elements 5 may have a token-name 9. The token-names 9 may be human-readable names.

The method may also comprise reading 507 stream-schema 10 of the received data-streams 4. Each one of the received data-streams 4 may have a stream-schema 10. Each stream-schema 10 may further comprise a list 11 of token-names 9 for the event-allocated data-elements 5 of the corresponding data-stream 4. The event-allocated data-elements 5 of the corresponding data-stream 4 may be capable of being identified based on the list 11 of token-names 9. Each stream-schema 10 may further comprise an index-definition 12 for each corresponding data-stream 4.

In addition, the method may comprise generating 508 indices 14 for the event-allocated data-elements 5 based on the corresponding index-definition 12 and the corresponding list 11 of token-names 9. The method may include the step of executing 509 a query 16 of the event-allocated data-elements 5 based on an index 14, and the step of retrieving 510 the event-allocated data-elements 5 based on results from the query 16. A detailed description of certain embodiments is further discussed below.

Streaming Block Store

The streaming block store 1 may be embodied in a system or method for persisting stream-oriented data in a highly scalable, efficient manner while retaining the ability to efficiently retrieve data previously written. While this write-optimized store 1 is designed to work over any kind of file system, the internal indexing structures and algorithms are design to work well with distributed file systems.

A block store 1 may comprise multiple data streams 4. A data stream 4 is conceptually similar to a table in a traditional SQL database in that a stream houses related data having some known structure. Each stream 4 consists of multiple events 8, which are individual items within the stream 4. Each event 8 within the stream 4 follows a schema 10 that describes the structure of events 8 within the stream 4 and contains metadata about the stream 4. For each stream 4, the schema 10 defines a list 11 of token names 9 that allow accessing data elements 5 within an event by a human-readable name. An event 8 therefore can be thought of as data structure that maps token names 9 to data values. Unlike a traditional SQL database, there are no type restrictions for data values; data values between events 8 in a stream 4 may vary by type and data values may contain compound data such as lists or even full objects.

A core concept of the streaming block store 1 is the data block 6, the minimal data unit that is processed by the block store 1. Similar to blocks in traditional file systems, a data block 6 contains a logical grouping of data from a single stream 4 that is kept together and read/written as a single unit. Upon creating, a writer assigns each data block 6 a globally unique identifier known as the block identifier 7.

As the block store 1 is designed for distributed systems, it must support concurrent readers and writers. In the block store 1, any node in the distributed system may insert data into the store 1 as long as that node has write access to the underlying file system used by the block store 1. When a node receives a request to write data to a particular stream, the node first reads schema information 10 for the stream 4 and allocates local memory to buffer incoming events for that stream 4. Each node caches stream-schema metadata 10 so that subsequent write requests for a stream 4 do not incur reads from the underlying file system.

Nodes acting as writers continually fill local buffers until they reach the block size, a configurable per-stream parameter that specifies the maximum size for data blocks 6 within a stream 4. After the buffer is full it is flushed out to the underlying file system and is reused for any new incoming data. For each stream 4, nodes may choose to allocate more than one buffer to each stream 4 to accommodate concurrent writers within the same node.

Data Indexes

Contained within the stream schema 10 is a definition for each index 14 configured for the stream 4. These indexes 14 are analogous to their counterparts in traditional SQL databases; nodes use these indexes 14 to efficiently trim down the set of data blocks 6 that must be read to satisfy a given query 16.

Indexes 14 are composed of two-tiers of special data blocks 6: index pages and index sets. Both of these types of data blocks 6 also follow the block size constraint set in the stream-schema 10. Index pages are maintained by each writer and contain summarized data for each completed data block 6. To minimize the amount of data read by querying nodes, index pages summarize data for more than one data block 6. When index pages are full or flushed out to the underlying file system, a summary of the index page is added to the top-level index set that contains root-level summary information for all index pages for that writer.

Querying Data

The block store structure does not limit what types of query mechanisms can be provided. The block store 1 may provide a "NoSQL"-type interface by exposing an API for directly manipulating data or a more traditional query interface created by translating string expressions into a sequence of operations that satisfy a query 16.

In the block store 1, any node in the distributed system may act as a query processor as long as the node can access index sets, index pages, and data blocks 6 in the underlying file system.

The mechanism for querying data is straightforward. Each query 16 has a set of constraints that control which data in the stream 4 is returned. A query processor may translate these constraints in the form of a Boolean expression in either product-of-sums or sum-of-products form so that each individual expression may be processed independently. For each expression in the constraint, the query processor will analyze the expression to see if an index 14 can be used to provide a set of candidate data blocks 6 that contain matching events 8 for that expression. If an index 14 cannot be used for the expression, the candidate set of data blocks 6 for the expression is set to all available data blocks 6 in the stream 4. Once the query processor has assembled the entire set of candidate data blocks 6, it fetches those data blocks 6 and evaluates the entire query expression against the data set.

In addition to the straightforward query mechanism described above, the output of a query 16 may be used as input to a streaming query processing system to provide join and windowing operations over the persisted stream data.

Deleting Data

Writers that need to remove data from the block store 1 may do so by extending the query procedure above with an additional step where an updated version of the data block 6 with some events removed is rewritten to the underlying file system. This operation does not need to rewrite any index pages as any false positives of candidate data blocks 6 returned from the index 14 will be ignored once the query expression is evaluated against the actual data block 6.

The block store 1 supports a more efficient removal operation in the form of removing whole data blocks 6. This deletion operation requires a file deletion operation in the underlying file system along with an update of all indexes that reference that data block 6. For efficiency, the index update operation may be batched or performed lazily on the next index update operation. This operation can be very advantageous for systems that receive incoming data in temporal order and have strict time-based data retention requirements.

Underlying File System Requirements

The block store 1 requires the underlying file system support concurrent updates to directory structures without corrupting data. For proper query operations, the block store 1 requires that writes to data blocks 6 are atomic so that other query nodes do not see data blocks 6 in an inconsistent state after new data blocks are written.

Most file systems support these constraints directly or with the addition of a locking service, making the block store 1 usable with a wide variety of file system implementations.

Consistency Model

The block store 1 provides clients with a relaxed consistency model for events 8 spanning multiple data blocks 6 and writers. The additional layers of buffering will cause data to become available only after each data block 6 reaches the block size and is flushed to disk. To avoid situations where data remains buffered for a long period of time and thus not visible to other nodes, writers can optionally flush pending data blocks 6 along with appropriate index page and index set updates to the underlying file system.

The exact nature of the visibility of writes depends on the behavior of the underlying file system. Most common file systems will provide an "eventual consistency" model.

A writer may provide sequential consistency to clients for data residing on a single data block 6 by using standard locking mechanisms.

Concurrency

The block store 1 provides no constraints on concurrency in terms of the number of concurrent readers and writers operating on streams. In practice, the concurrency of the block store 6 will be limited by the capabilities of the underlying file system.

Compression

For certain types of stream data it may be advantageous to compress data blocks 6, index pages, and index sets. This can be done before flushing each of these items to the underlying file system and by decompressing each item when it is read out of the underlying file system.

Index Types

The block store 1 supports any type of index 14 that conforms to the requirements listed above. The following index types are known to work well in the block store 1.

Hash Index:

A hash index 14 tracks values within a stream 4 and can be used to efficiently fetch all events 8 containing a particular value. Index pages for this type are composed of a list of data values, where each data value is associated with a list of data block identifiers for data blocks 6 containing that data value. Index sets for this type are composed of a list of index page identifiers associated with a Bloom filter that encodes which data values are reachable from the given index page.

Range Index:

A range index 14 tracks value ranges within a stream 4 and can be used to efficiently fetch all events 8 that lie between two particular values. Index pages for this type are composed of a list of data values, where each data value is associated with a list of data block identifiers for data blocks 6 containing that data value. Index sets for this type are composed of a list of index page identifiers associated with the minimum and maximum data values reachable from the given index page.

Interval Index:

An interval index 14 tracks events 8 associated with some interval and can be used to efficiently fetch all events 8 that intersect some given range. Index pages and index sets for this type may be any appropriate hierarchical multidimensional index 14, where the index sets contain root-level information and index pages contain subsequent children for the root-level information in the index 14.

Full-Text Index:

A full-text index 14 tracks textual information within a stream 4 and can be used to efficiently perform keyword searches on stream data. Index pages for this type contain an inverted index that maps keywords to data block identifiers for data blocks containing that keyword, along with any other ranking metadata needed by the information retrieval library being used. Index sets for this type contain a list of index page identifiers and any available root-level aggregation structure supported by the information retrieval library.

Serialized Data Representation

For storing data inside data blocks 6, index pages, and index sets, the block store 1 makes use of ASN.1 encodings using the Distinguished Encoding Rules (DER) defined in ITU-T Recommendation X.690.

Within the underlying file system, the block store 1 places data blocks 6 of the above types in well-known directories. The conventions currently used by the block store 1 are as follows:

Each stream 4 is housed in a directory underneath a main Streams directory with the directory name indicating the name of the stream 4. Within the Streams directory, schema metadata 10 is stored in a file named schema. Data blocks 6 are stored underneath the stream directory in a directory named blocks.

Index data is stored underneath the stream directory in a directory named index. Each index 14 defined in the schema 10 is assigned a number and all data for that index 14 resides underneath the index directory in a directory with the name of the index number. Index pages are stored underneath each index directory in a directory named data. Index sets are stored as files with the name of the file set to the globally unique identifier of the writer for that index. These index set files are stored in a directory named sets underneath each index directory.

To reduce overhead of maintaining directory listings for streams 4 consisting of large numbers of data and index pages, the block store 1 shards the block identifiers across multiple directories. This is especially effective for file systems whose performance degrades after tens of thousands of files are present in a single directory.

It will be understood by those of ordinary skill in the art that the pseudo-embodiments described herein are representative of preferred embodiments of the present invention and are not limitative thereof.

In an embodiment, a system for persisting streams 4 of data in a distributed computing environment may comprise a plurality of data storage devices 2. Each device 2 may be connected to a network 3 and may comprise a processor and a data store 1. The processors may be adapted to store a plurality of data streams 4 in block stores 1 on the data storage devices 2. Each block store 1 may comprise data blocks 6. The blocks 6 may have a globally unique block identifier 7. The data blocks 6 may comprise a plurality of events 8. The events 8 may comprise a plurality of data elements 5 identified by token names 9. The block store 1 may further comprise a schema 10 identifying the data elements 5 and at least one index 14 based on the schema 10. The system may be capable of storing data elements 5 from the data streams 4 in a plurality of the blocks 6 and accessing and updating the data elements 5 through the index 14.

In an embodiment, a computer readable medium containing executable instructions for a system for persisting streams 4 of data in a distributed computing environment may comprise a plurality of data storage devices 2. Each device 2 may connect to a network 3 and may comprise a processor capable of executing said instructions. A data store 1 may comprise instructions directing the processors to store a plurality of data streams 4 in block stores 1 on the data storage devices 2. Each block store 1 may comprise data blocks 6. The blocks 6 may have a globally unique block identifier 7. The data blocks 6 may comprise a plurality of events 8. The events 8 may comprise a plurality of data elements 5 identified by token names 9. The block store 1 may further comprise a schema 10 identifying the data elements 5 and at least one index 14 based on the schema 10. The system may be capable of storing data elements 5 from the data streams 4 in a plurality of the blocks 6 and accessing and updating the data elements 5 through the index 14.

Although some of the drawings illustrate a number of operations in a particular order, operations which are not order-dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof. The term "adapted" when used in this application shall mean programmed, configured, dimensioned, oriented and arranged as appropriate to the purpose or function described.

While the invention has been particularly shown and described with reference to an embodiment thereof, it will be understood by those skilled in the art that various changes in form and details may be made therein without departing from the spirit and scope of the invention.

What is claimed is:

1. A system for storing and retrieving data, comprising:
a plurality of distributed devices adapted to communicate via a network, wherein each one of the plurality of distributed devices comprises a processor;
a plurality of data-streams received from the plurality of distributed devices, each one of the plurality of data-streams comprises data-elements;
a plurality of block-stores that are stored on the plurality of distributed devices, the plurality of block-stores store via the processors the data-elements of the received plurality of data-streams;
one or more data-blocks of the block-stores, the stored data-elements allocated to the one or more data-blocks, each one of the block-stores comprising one or more data-blocks, each data-block comprising the stored data-elements of only one of the received plurality of data-streams, the data-blocks of a single data-stream are logically grouped, and each one of the data-blocks are read and written as a single unit;
a block-identifier assigned to each one of the data-blocks, the block-identifier being globally unique;
events of the one or more data-blocks, the block-allocated data-elements further allocated to the events of the data-blocks, each one of the data-blocks comprise one or more events, each one of the events comprising the block-allocated data-elements of the corresponding data-block;

token-names assigned to each one of the event-allocated data-elements, each one of the event-allocated data-elements has a token-name, the token-names being human-readable names;

stream-schema of the received plurality of data-streams, each one of the received plurality of data-streams having a stream-schema, each stream-schema further comprising a list of token-names for the event-allocated data-elements of the corresponding data-stream, the event-allocated data-elements of the corresponding data-stream being capable of being identified based on the list of token-names, wherein each stream-schema further comprises an index-definition for each corresponding data-stream; and, indices generated for the event-allocated data-elements based on the corresponding index-definition and the corresponding list of token-names, whereby at least one query for the event-allocated data-elements may be executed in order to retrieve data-elements of the received plurality of data-streams, the at least one query is based on at least one of the indices.

2. The system of claim 1, wherein each of the plurality of block-stores stores the stored data-elements of two or more of the received plurality of data-streams.

3. The system of claim 1, wherein each index-definition comprises an index-page and an index-set for each of the data-blocks of the corresponding data-stream, and wherein the stream-schema further comprises block-size information for the data-blocks of the corresponding data-stream, wherein the block-size information provides a maximum block-size for data-blocks within the corresponding data-stream.

4. The system of claim 3, wherein each of the index-pages further comprises a reference to a block-identifier for a corresponding data-block.

5. The system of claim 3, wherein the index-page further comprises page-data summarized-information of the data-blocks of the corresponding data-stream, and wherein the index-set further comprises root-data summarized-information of the index-pages of the corresponding index-definition.

6. The system of claim 1, wherein the data-elements have a common structure.

7. The system of claim 6, wherein the common structure of the data-elements is an unrestricted-structure.

8. The system of claim 6, wherein each stream-schema corresponds to a common structure of each one of the events of the corresponding data-stream.

9. The system of claim 1, wherein the data-elements have different structures, wherein each stream-schema corresponds to varying structures of the events of the corresponding data-streams.

10. The system of claim 1, wherein the stored data-elements comprise compound-data.

11. The system of claim 10, wherein the compound-data is selected from a group consisting of lists and objects.

12. The system of claim 1, wherein the block-stores support concurrent readers and writers.

13. The system of claim 1, wherein the data-elements that are received from a distributed device are stored in a targeted block-store only when the distributed device has write-access to a file-system utilized by the targeted block-store.

14. The system of claim 1, further comprising:
a request to write data of a data-stream, wherein the request is received from a distributed device, wherein the stream-schema of the received data-stream is capable of being read; and local-memory allocated to buffer each one of the events of the corresponding data-stream, wherein metadata of the stream-schema is capable of being cached.

15. The system of claim 1, further comprising:
metadata of the stream-schema of the received plurality of data-streams, wherein metadata of the stream-schema is capable of being cached, wherein each stream-schema comprises metadata for the corresponding data-stream.

16. The system of claim 1, further comprising:
a buffer filled until the buffer reaches a block-size provided by the block-size information for the data-blocks of the corresponding data-stream; and
a file-system utilized by the targeted block-store, wherein the buffer is capable of being flushed into the file-system, wherein the buffer is capable of being reused for the data-elements of the received plurality of data-streams.

17. The system of claim 1, further comprising:
more than one buffer allocated to a single data-stream, wherein concurrent-writers are utilized in the same distributed device.

18. The system of claim 1, further comprising:
a transaction performed on the event-allocated data-elements, wherein the transaction is one transaction selected from the group consisting of querying, retrieving, accessing, updating, and deleting.

19. The system of claim 3, further comprising:
each index-definition having a set of constraints that control which data-elements in a data-stream are returned, wherein the index-set and the index-page for the data-blocks are capable of being accessed;
the constraints capable of being translated into a Boolean-expression, wherein the Boolean-expression is selected from a group consisting of a product-of-sums expression and a sum-of-products expression, wherein each Boolean-expression is translated independently;
the data-blocks analyzed with each Boolean-expression;
a candidate set of data-blocks for matching-events of a Boolean-expression, the candidate set of data-blocks having zero matching-events capable of being set to comprise all data-blocks in the corresponding data-stream;
the candidate set of data-blocks capable of being retrieved; and
the candidate set of data-blocks capable of being evaluated.

20. The system of claim 19, further comprising:
at least one of the candidate set of data-blocks updated with updated data-blocks, wherein at least one of the events is removed in the updated data-blocks, wherein false-positives returned from a query of the updated data-blocks are ignored.

21. The system of claim 1, further comprising:
the results from the at least one query used as input to a streaming-query, wherein the streaming-query provides join and windowing operations for data-elements of the received plurality of data-streams.

22. The system of claim 1, further comprising:
data-blocks removed based on a file-deletion operation and updated indices that reference that data block.

23. The system of claim 22, wherein the file-deletion operation is a batched operation.

24. The system of claim 22, wherein the file-deletion operation is performed on a subsequent index-update operation.

25. The system of claim 1, wherein at least one of the block-stores requires a file-system that supports concurrent updates to directory-structures, wherein the at least one of the block-stores requires that writes to data-blocks are atomic, wherein the data-blocks of the at least one of block-stores are consistent for each query performed after new data-blocks are written.

26. The system of claim 25, wherein a locking service is utilized by the file-system.

27. The system of claim 3, furthering comprising:
pending data-blocks and corresponding index-pages and index-sets capable of being flushed.

28. The system of claim 1, wherein at least one of the block-stores has unconstrained concurrency, wherein the unconstrained concurrency of the at least one of the block-stores is limited by file-system capabilities.

29. The system of claim 1, further comprising:
the data-blocks, the index-pages and the index-sets capable of being compressed;
the compressed data-blocks, index-pages and index-sets capable of being flushed; and
the flushed data-blocks, index-pages and index-sets capable of being decompressed.

30. The system of claim 1, wherein at least one of the plurality of distributed devices is a distributed storage device.

31. The system of claim 1, wherein at least one of the plurality of distributed devices is a sensor.

32. The system of claim 1, wherein at least one of the plurality of distributed devices is an infrastructural equipment.

33. The system of claim 1, wherein at least one of the indices is a hash-index.

34. The system of claim 1, wherein at least one of the indices is a range-index.

35. The system of claim 1, wherein at least one of the indices is an interval-index.

36. The system of claim 1, wherein at least one of the indices is a full-text index.

37. The system of claim 1, wherein at least one of the block-stores stores data based on an Abstract Syntax Notation One (ASN.1) encoding standard.

38. The system of claim 1, wherein at least one of the block-stores stores data based on a Distinguished Encoding Rules (DER) message-transfer syntax.

39. The system of claim 38, wherein the Distinguished Encoding Rules (DER) message-transfer syntax is based on a X.690 International Telecommunication Union (ITU)-T recommendation.

* * * * *